(12) United States Patent
Church et al.

(10) Patent No.: US 11,707,889 B1
(45) Date of Patent: Jul. 25, 2023

(54) MODULAR MOBILE DIRECT DIGITAL MANUFACTURING SYSTEMS (M2DDM)

(71) Applicant: Sciperio, Inc, Orlando, FL (US)

(72) Inventors: Kenneth H. Church, Orlando, FL (US); Charles Michael Newton, Grant, FL (US); Michael W. Owens, Orlando, FL (US)

(73) Assignee: SCIPERIO, INC, Orlando, FL (US)

( * ) Notice: Subject to any disclaimer, the term of this patent is extended or adjusted under 35 U.S.C. 154(b) by 0 days.

(21) Appl. No.: 17/405,200

(22) Filed: Aug. 18, 2021

Related U.S. Application Data

(60) Provisional application No. 63/067,540, filed on Aug. 19, 2020.

(51) Int. Cl.
*B29C 64/25* (2017.01)
*B33Y 30/00* (2015.01)

(52) U.S. Cl.
CPC .............. *B29C 64/25* (2017.08); *B33Y 30/00* (2014.12)

(58) Field of Classification Search
None
See application file for complete search history.

(56) References Cited

U.S. PATENT DOCUMENTS

| | | | |
|---|---|---|---|
| 2013/0193619 A1* | 8/2013 | Church | B29C 64/165 264/109 |
| 2016/0116904 A1* | 4/2016 | Jensen | B33Y 30/00 700/118 |
| 2017/0334134 A1* | 11/2017 | Herzog | B29C 64/393 |
| 2019/0091769 A1* | 3/2019 | Karuppoor | B33Y 40/20 |
| 2021/0008621 A1* | 1/2021 | Eonta | B22F 9/082 |

FOREIGN PATENT DOCUMENTS

WO  WO-2018022147 A1 *  2/2018  ........... B29C 64/118

OTHER PUBLICATIONS

Gibson, I., Rosen, D., Stucker, B. (2015). Direct Digital Manufacturing. In: Additive Manufacturing Technologies. Springer, New York, NY. https://doi.org/10.1007/978-1-4939-2113-3_16 (Year: 2015).*

* cited by examiner

*Primary Examiner* — Yung-Sheng M Tsui
(74) *Attorney, Agent, or Firm* — Goodhue, Coleman & Owens, P.C.

(57) ABSTRACT

A modular system for manufacturing includes a modular housing, at least one manufacturing platform disposed within the modular housing for direct digital manufacturing of an item, and a modular grid for power and network connections positioned along a plurality of interior walls of the modular housing.

27 Claims, 7 Drawing Sheets

MODULAR MOBILE DIRECT DIGITAL MANUFACTURING SYSTEMS (M2DDM)

RELATED APPLICATIONS

This application claims priority to U.S. Provisional Patent Application No. 63/067,540, filed Aug. 19, 2020, hereby incorporated by reference in its entirety.

FIELD OF THE INVENTION

The present disclosure relates to manufacturing. More particularly, but not exclusively, the present disclosure relates to Modular Mobile Direct Digital Manufacturing Systems (M2DDM).

BACKGROUND

Historical manufacturing has been based on brick and mortar factories that are large, are not easily reconfigurable and localized and carries too much inertia to respond to instantaneous market demands that are quickly shifting. Moreover, where supply chains are unreliable, manufacturing at a centralized facility and then distributing may create unacceptable delays. Thus, there is a need to develop solutions that allow for regional and local manufacturing or otherwise allow for more distributed manufacturing.

For example, consider the manufacturing and distribution of medical personal protective equipment (PPE) products during a pandemic. Where such products are manufactured at an overseas factory and demand is high, it may be difficult and expensive to obtain such products in a timely manner. Moreover, there may be uncertainty with respect to the number of such products needed at a particular location and so given this uncertainty as well as the uncertainty in future availability and timing of delivery may cause a user of such products to over order thereby further inflating the demand and thus add to supply chain issues.

Thus, there are benefits, including economic benefits which could be provided by regional and local manufacturing or otherwise distributed manufacturing that shift manufacturing closer in time and location to the point of need. For example, distributed manufacturing can fuel local economies as well as provide multiple sources to get a specific product as demand dictates or where a local disaster may shut down. The ability to mobilize manufacturing and even research requires the development of a reconfigurable modular capability that lowers the inertia to respond to immediately changing demands.

There are also issues with current military applications for on-site manufacturing. Rapid Fabrication via Additive Manufacturing on the Battlefield (RFAB) is an Army vision that looks at containerizing mission capability whether it be a machine shop, medical facilities or 3D printing to support point of need requirements. Although the container itself can be reconfigured, this is not easily done nor quickly reconfigurable using current manufacturing technologies. In particular, there are numerous problems encountered when attempting to modularize any type of manufacturing which are further multiplied if the modularization was also reconfigurable and scalable. Therefore, what is needed are methods, apparatus, and systems which allow for mobilization and reconfiguration of manufacturing.

SUMMARY

Therefore, it is a primary object, feature, or advantage of the present invention to improve over the state of the art.

It is a further object, feature, or advantage of the present disclosure to modularize manufacturing.

It is a still further object, feature, or advantage of the present disclosure to provide mobile manufacturing that can be easily reconfigurable.

Another object, feature, or advantage is to provide modular mobile manufacturing systems which can be configured to accommodate different types of materials.

Yet another object, feature, or advantage is to provide a modular mobile manufacturing system which provides universal mechanical, electrical and digital connection of equipment.

A further object, feature, or advantage is to provide a modular mobile manufacturing system that allows for rapid rack and stack of digital manufacturing.

A still further object, feature, or advantage is to provide a modular mobile manufacturing system that allows rapid deployability and reconfigurability.

Another object, feature, or advantage is to provide a modular mobile manufacturing system that allows for multiple power sources and systems such as grid, solar, and multi-fuel systems.

Yet another object, feature, or advantage is to provide a modular mobile manufacturing system that allows for multiple communications capabilities include WiFi, LiFi, and satellite communications.

A further object, feature, or advantage is to provide a modular mobile manufacturing system that may have dual use purposes such as in both commercial and military applications.

A still further object, feature, or advantage is to provide a modular mobile manufacturing system that is network capable or can operate autonomous.

Another object, feature, or advantage is to provide a modular mobile manufacturing system that provides cyber secure communications and file transactions including block chain.

Yet another object, feature, or advantage is to provide a modular mobile manufacturing system that may be configured to include a landing area for drones for pickup and/or delivery.

One or more of these and/or other objects, features, or advantages of the present disclosure will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a modular system for manufacturing is provided which includes a modular housing, at least one manufacturing platform disposed within the modular housing for manufacturing of an item, and a modular grid for power and network connections positioned along a plurality of interior walls of the modular housing. The at least one manufacturing platform may include at least one 3D printer. The interior walls of the modular housing may have a metallic skin. The modular housing may include electrostatic discharge flooring. The modular housing may include a plurality of lighting elements embedded in at least one (a) one or more of the interior walls of the modular housing, (b) a flooring of the modular housing, and/or (c) a ceiling of the modular housing. The plurality of lighting elements may include ultraviolet lighting elements. The modular housing may include an HVAC system wherein at least a portion of the HVAC system is integrated into at least one at least one (a) one or more of the interior walls of the modular housing, (b) a flooring of the modular housing, and/or (c) a ceiling of the modular housing. The modular housing may further include at least one interface housing having a magnet for connection to a location along one of the interior walls. The interface housing may include a power receptacle and/or a network interface. The modular housing may further include a communications system which provides for block chain based secure file transactions. The modular housing may be collapsible and various wall panels may be hinged together.

BRIEF DESCRIPTION OF THE DRAWINGS

Illustrated embodiments of the disclosure are described in detail below with reference to the attached drawing figures, which are incorporated by reference herein.

DETAILED DESCRIPTION

Direct digital manufacturing can define the core of the need for reconfigurability. Direct digital manufacturing allows the same manufacturing equipment to produce numerous different types of manufactured items. The direct digital manufacturing equipment may reside in a modular housing such as the current industry standard ISO-CONEX boxes as an example. Of course, other types of modular housings or containers may be used such as shipping containers used in the transportation shipping industry. The modularity can encompass multi-process and multi-material feedstock that can manufacture using direct digital files.

Figure 1:
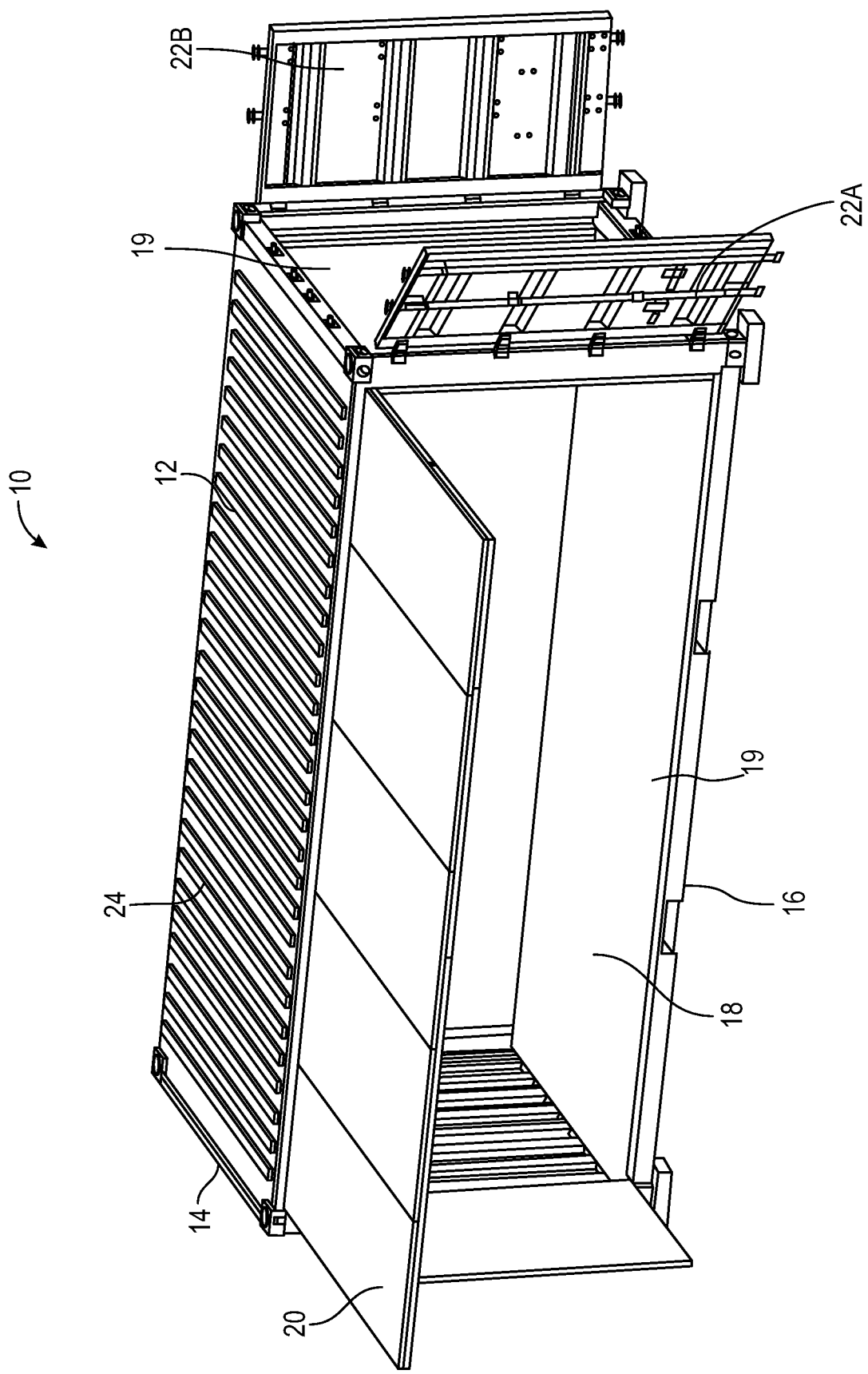
FIG. 1 illustrates a housing or container for a modular system.

FIG. 1 illustrates one example of a modular system 10 with a modular housing 12. The modular housing or container shown is collapsible. The modular housing 12 has a side wall 14 and a floor 18. The floor 18 flooring may be of any number of types. For example, the flooring may be electrostatic discharge (ESD) conductive flooring. Such flooring may be beneficial in a number of different environments including where the modular housing 12 is used in electronics manufacturing, military applications, or medical facility manufacturing. All wall panels may be tied to ground and ground may be added prior to floor installation. In addition, radio-frequency (RF) shielding may be integrated into the modular housing 12 such as being integrated into wall panels, flooring, and ceiling. Lighting elements 19 may also be embedded in the floor 18, side wall 14, doors 22A, 22B, or any other interior wall, floor, or ceiling. The lighting elements may be visible lighting elements, ultraviolet lighting elements or other types of lighting elements.

Doors 22A, 22B form another end opposite the sidewall 14. A wall 20 may be configured to hinge downwardly to form a front wall or may be raised open. Although one configuration is shown in FIG. 1, it is to be understood that any number of other configurations may be provided which allow the modular housing 12 to be modular and reconfigurable. It is to also be understood that the modular housing 12 may be positioned adjacent other modular housings to form a larger system of modular housings. The modular housing 12 may also be collapsible in order to reduce size during transport.

Figure 2:
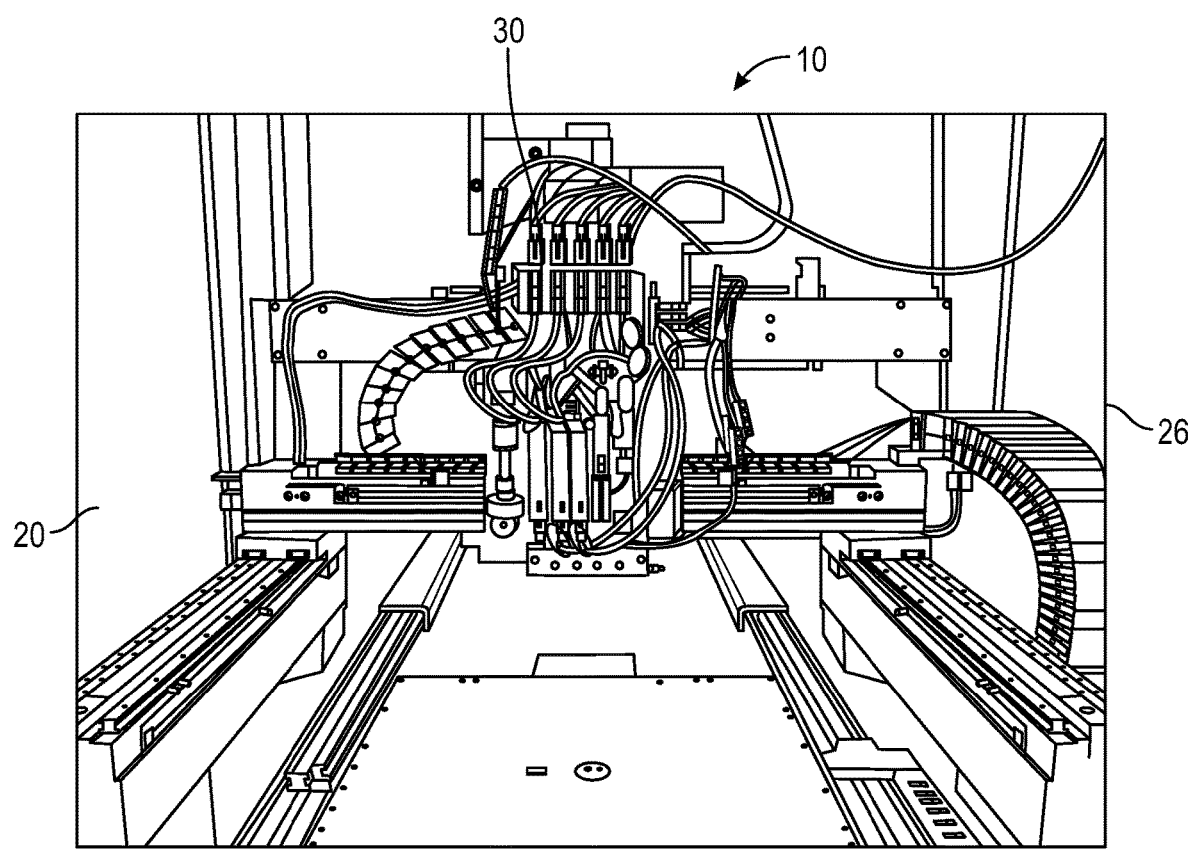
FIG. 2 illustrates one example of a digital manufacturing system within a modular housing of the modular system.

FIG. 2 illustrates the modular system 10 with manufacturing equipment 30 installed within a modular housing 12 having opposite walls 20, 26. The manufacturing equipment 30 shown includes a 3D printer. The 3D printer may be a part of a manufacturing system for manufacturing any number of different types of items using any number of different types of materials. It is to be further understood that what is shown is merely one of many potential configurations of manufacturing systems.

Figure 3:
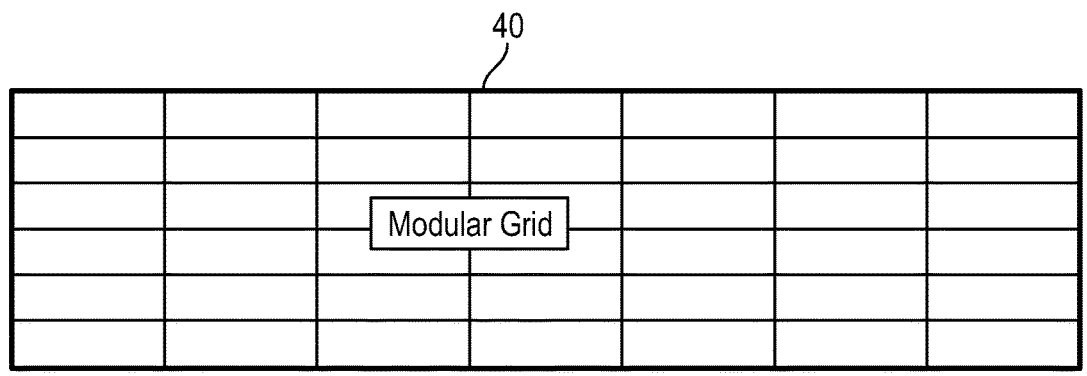
FIG. 3 is a representation of a modular grid of the modular system.

FIG. 3 illustrates a modular grid 40. The modular grid allows for power, network, or other connections to be made throughout the modular housing to enhance reconfigurability and allow for placement of manufacturing equipment in different positions.

Figure 4:
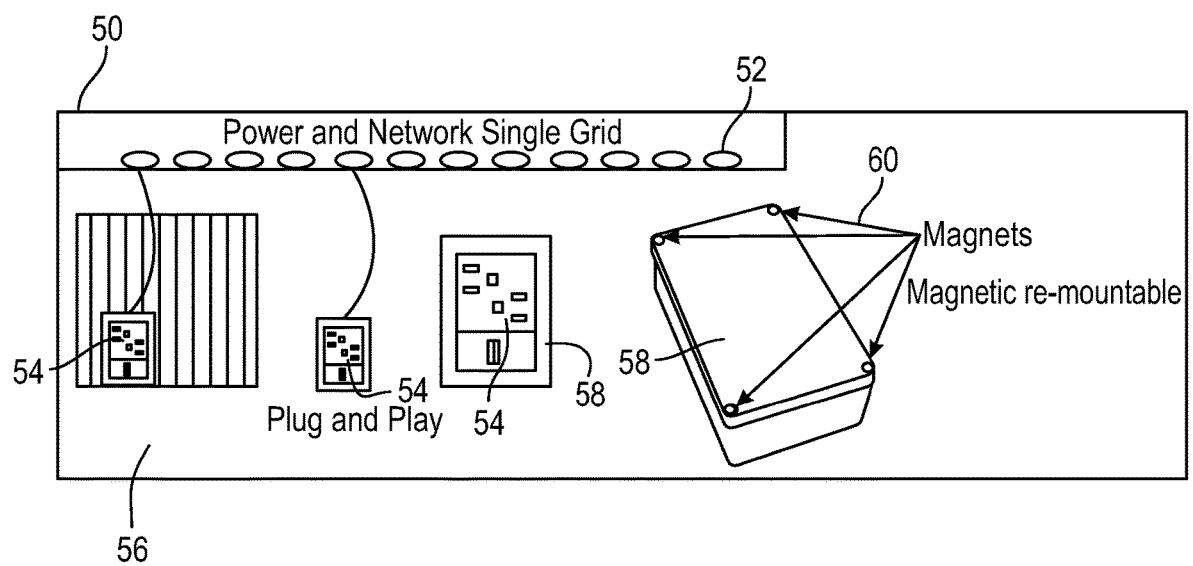
FIG. 4 illustrates one example of a power and network grid of the modular system.

FIG. 4 illustrates one manner in which modular power may be provided for use within a modular housing. As shown in FIG. 4, interior walls of the modular system may be formed of metal or have a metallic skin to provide shielding. Power connectors and other types of interface connectors such as network connectors, USB connectors, or other types of connectors may be housed in assemblies which may include one or more magnets. This allows the connector assemblies to be positioned wherever desired along the interior walls. Such an approach is highly advantageous as it allows for power, network, and other connections to be rapidly positioned within the modular housing wherever is most convenient and in a manner which is least obtrusive to the operation of the manufacturing equipment within the modular housing 12.

Figure 5:
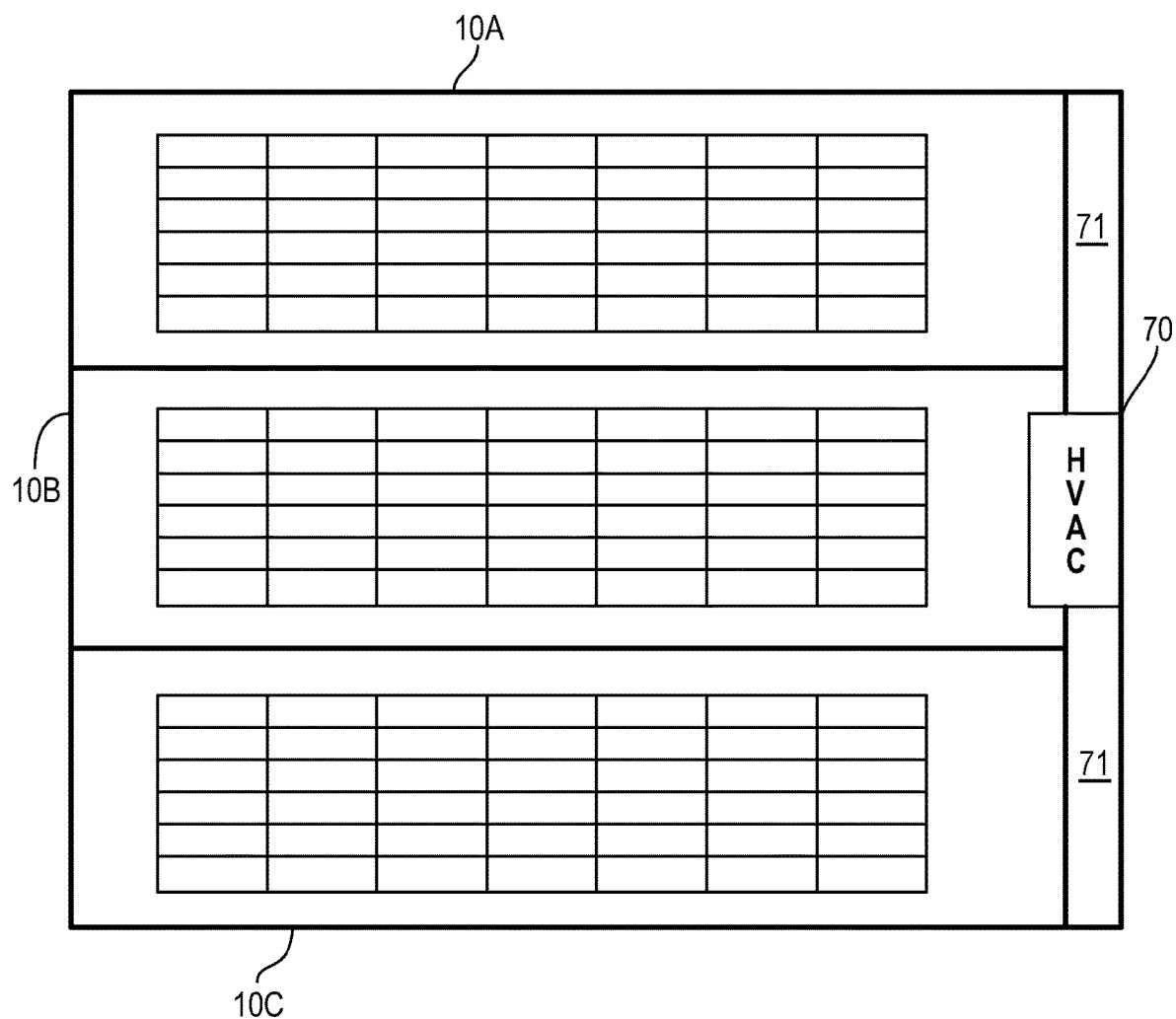
FIG. 5 illustrates a combination of modular systems with one of the modular systems including HVAC.

FIG. 5 illustrates an example of environmental controls in the form of heating, ventilation and air conditioning (HVAC) equipment 70. HVAC equipment may be moved or re-positioned as need be. For example, in the example shown, HVAC equipment 70 is positioned at a central modular system 10B which is positioned between modular systems 10A and 10B. In this example, equipping a single unit with HVAC equipment 70 may be sufficient for the system 10 comprising three modular sub-systems 10A, 10B, 10C. The HVAC equipment may include heaters such as electric heaters or furnaces, fans, air conditioners, and/or other types of HVAC equipment. Duct work 71 may extend from the HVAC equipment 70 of the modular system 10B to the adjacent modular systems 10A, 10C to provide for air flow between the modular systems.

Figure 6:
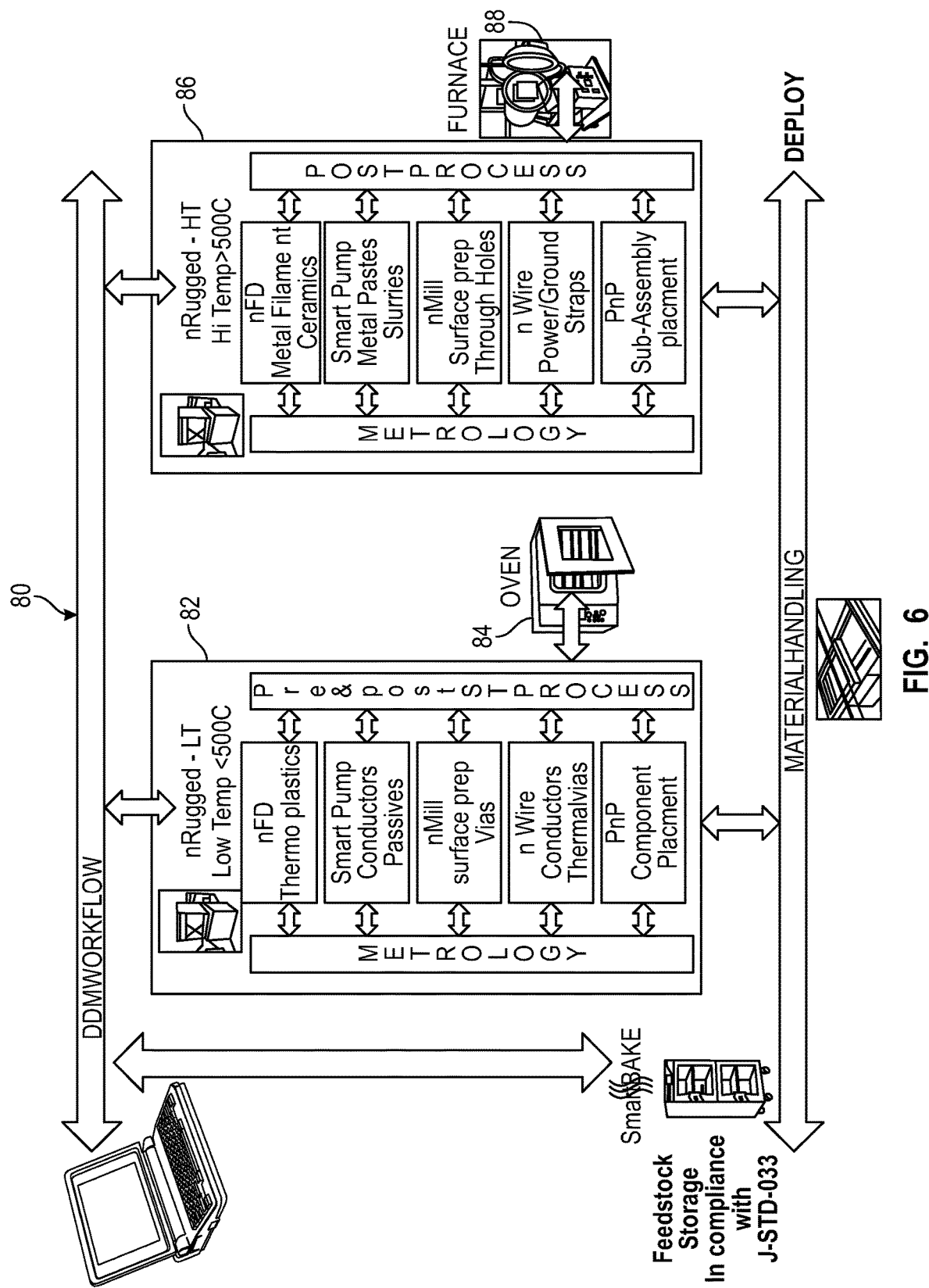
FIG. 6 illustrates workflow for representative modular systems for manufacturing.

FIG. 6 illustrates an example of a modular system for providing direct digital manufacturing. As shown, there is a low temperature manufacturing system 82 and a high temperature manufacturing system 86. The low temperature manufacturing system 82 is configured to operate at temperatures under 500 degrees Celsius while the high temperature manufacturing system 86 is configured to operate at temperatures over 500 degrees Celsius.

It is to be understood that a given product to be manufactured may have multiple or many different parts formed from different materials. Having different manufacturing systems allows for different materials to be used. In the system shown in FIG. 6, the object to be manufactured may include electronics and may include a circuit board with through-holes and which has various components and the design may include conductors, passives, power/ground strips, vias, thermal vias, The low temperature manufacturing system 82 may include a 3D printing system. One example of such a system is the nFD™ system available from nScrypt, Inc. The nFD™ device is driven by a high-precision computer controlled system that allows the user to precisely place materials in a specified XYZ location. The size of the nFD™ was also designed with the approach that size matters and therefore this device has an intentionally narrow profile to allow multiple devices to be utilized on a single hardware platform. The nFD™ prints thermoplastics utilizing a flexible approach that allows the user to choose pen tip shapes and sizes. The interchangeable nozzles, nTips™ (also available from nScrypt, Inc.), allow users to print parts more accurately than other 3D printing systems. In the low temperature manufacturing system, materials such as thermoplastics such as Acrylonitrile butadiene styrene (ABS), polylactide (PLA), polyetherimide (PEI) materials (such as ULTEM products from SABIC) may be used. Of course, other types of 3D printing systems may be used.

The system may include may provide a dispensing pump to provide precise control, maintain a consistent material flow rate, and handle an extreme range of material viscosities. One example of such a device is the SmartPump™ device from nScrypt, Inc. By maintaining constant material pressure and running a customizable computer-controlled valve open and close routine, the SmartPump™ can generate precise starts and stops, maintain a consistent material flow rate, and handle an extreme range of material viscosities which is advantageous for dispensing materials to form conductors or passive components. Of course, other types of dispensing systems may be used.

The system may also include a device for milling such as to provide surface preparation, add through holes or perform other functions. One example of such a device is the nMill™ device from nScrypt, Inc. which is a high speed spindle designed for micro-precision milling, drilling, and polishing.

The system may also provide for forming wires or thermal vias such as using an nWire™ device from nScrypt, Inc. Of course other types of manufacturing systems may be used.

Pick and place may be performed to place components. One example of a pick and place system is the nPnP360™ device from nScrypt, Inc. which applies a light pressure on a component for picking and placing and which can be configured to accommodate various sized components.

Various measurements may be taken by one or more metrology systems which may be used to control various processes. For example, relative positions of moving parts of each of various devices within the system or of objects constructed by the various devices may be monitored and tracked. It is contemplated that calibrations may be performed once all systems within a modular housing have been installed. In addition to the manufacturing processes discussed it is to be understood that other pre and post processes may be used. An oven 84 may be used for the low temperature manufacturing system to maintain desired temperatures. Feedstock such as the thermoplastics may be stored in one or more dry cabinets such as the SmartBAKE™ device from Electronic Controls Design Inc. Of course, what is described herein, are merely examples of types of manufacturing systems that may be incorporated together into the modular system.

The high temperature manufacturing system 86 may be used for materials such as metal filament and ceramics such as using another nFD™ device or alternative 3D printing device. Similarly, another SmartPump™ device from nScrypt, Inc may be used such as to dispense metal pastes and slurries. Another maintaining constant material pressure and running a customizable computer-controlled valve open and close routine, the SmartPump™ can generate precise starts and stops, maintain a consistent material flow rate, and handle an extreme range of material viscosities which is advantageous for dispensing materials to form conductors or passive components. Of course, other types of dispensing systems may be used. The system may also provide for forming power or ground straps such as using an nWire™ device from nScrypt, Inc. Of course other types of manufacturing systems may be used.

Pick and place may be performed to place components such as using another nPnP360™ device from nScrypt, Inc. The device may be used for sub-assembly placement. A furnace 88 is shown for providing the high temperature environment. In the high temperature system, various measurements may be taken by one or more metrology systems which may be used to control various processes. For example, relative positions of moving parts of each of various devices within the system or of objects constructed by the various devices may be monitored and tracked. It is contemplated that calibrations may be performed once all systems within a modular housing have been installed. In addition to the manufacturing processes discussed it is to be understood that other pre and/or post processes may be used. Of course, what is described herein, are merely examples of types of manufacturing systems that may be incorporated together into the modular system.

Figure 7:
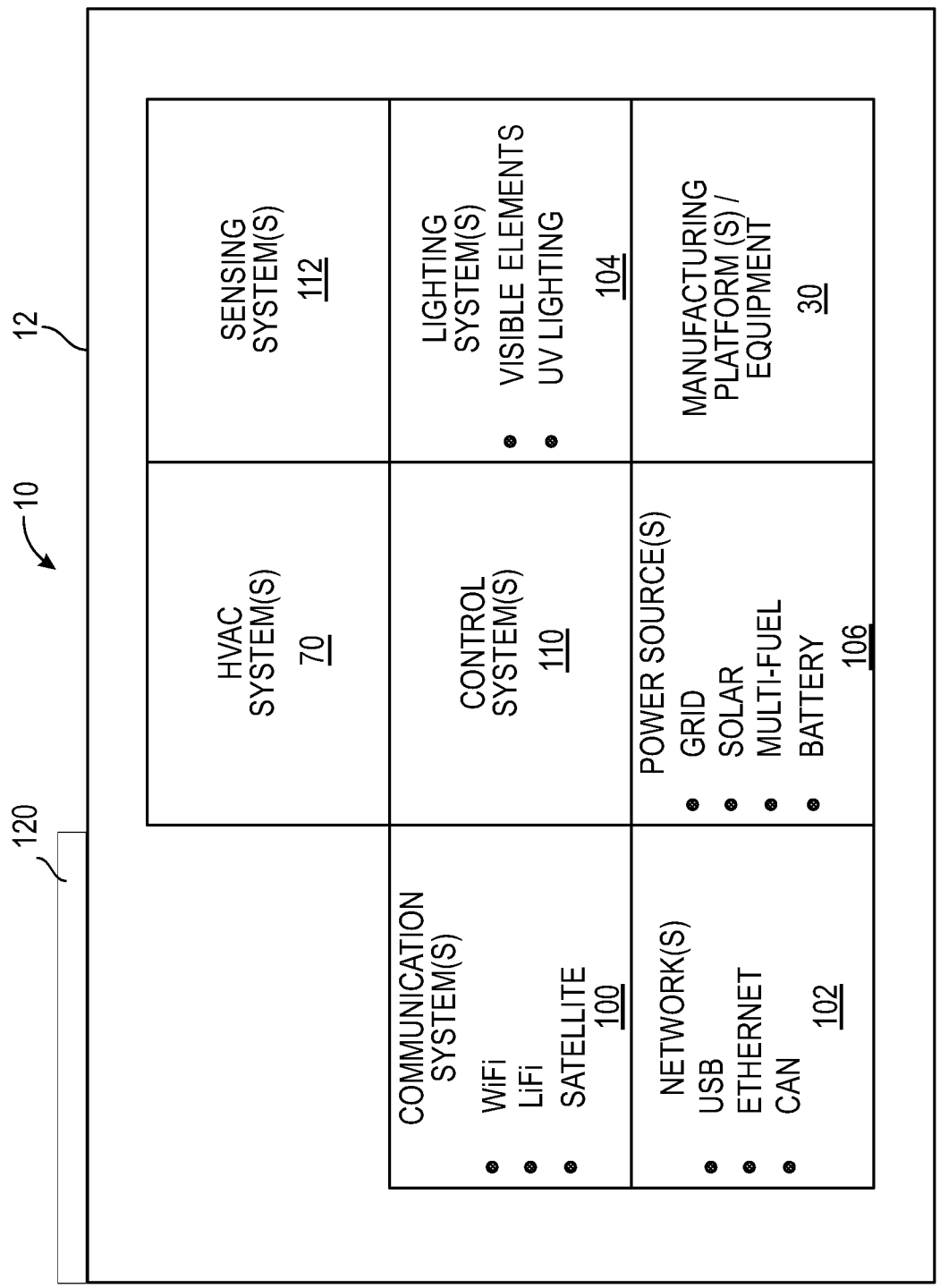
FIG. 7 is a block diagram of the modular system.

FIG. 7 is a block diagram illustrating examples of systems that may be contained within or associated with the modular housing 12. It is to be understood that the modular housing and its contents may be readily re-configured so additional sub-systems beyond those shown in FIG. 7 may be added. Similarly, some of the sub-systems shown in FIG. 7 may be duplicated or eliminated from a particular modular housing. It is to be further understood that more than one modular housing may be connected together and that these and other sub-systems may be spread across the system 10 which may have multiple modular housings 12.

As shown in FIG. 7, one or more communication systems 100 may be present. Communications between different devices within a modular housing or devices within adjacent or nearby modular housings may be performed using USB/Ethernet/CAN bus or other types of network interfaces. In addition wireless communications may be performed with NFC, Bluetooth, WiFi/LiFi, and satellite communications (satcom) transceivers.

It is contemplated that a system may have the capability for multiple types of communications. It is also contemplated that a system can operate independently and autonomously without a network connection where needed.

It is contemplated that the system allows for multiple power sources or systems 106 to be used. These may include connection to an existing power grid, use of solar energy, multi-fuel configurations, batteries, or other types of power sources. It is further contemplated that each modular housing need not have its own power source as it may be electrically connected to a neighboring modular housing which includes a power source.

The system may be re-configured to provide different levels or types of security as may be appropriate for a particular application or particular environment. This may include independent and autonomous operation where there is no connection to an outside network. This may include use of encrypted communications via secure satellite communications. This may further include block chain file tracking and validation or other security measures.

The modular housing 12 may have one or more lighting systems 104. The lighting systems 104 may include lighting elements which are embedded in the walls, ceiling, and or floor of the modular housing 12. The embedded lighting may include visible lighting in the walls, ceiling and floor that can change brightness and color digitally. The embedded lighting may include embedded ultraviolet (UV) (including UVc, light at about 200 to 280 nm in wavelength) LEDs that can be controlled digitally for sterilizing.

The modular housing 12 may include various sensing systems 112. The sensing systems may include sensors for real time feedback to control environment and equipment, sensors for chemical, biological and radiation levels, temperature, humidity, lighting levels, in and around the box. The sensors may include sensors used to detect or monitor configuration of the modular housing 12 (such as positions of doors or walls), position, operation, and state of systems within the modular housing 12 or associated with the modular housing 12, or other types of sensing systems 112. It is to be further understood that the various sub-systems may include their own sensors as well.

A control system 110 may also be present that may be used to control one or more sub-systems, monitor one or more sub-systems or coordinate control with remote systems or additional modular housings. The control system 110 may include an intelligent control which may be in the form of one or more processors. The control system 110 may be operatively connected to the communication system(s) 100 in order to send and receive communications. The control system 110 may be operatively connected to one or more networks 102 with each network having a network interface. The control system 110 may be operatively connected to one or more sensing systems 112 in order to receive sensor data regarding operation of processes within the modular housing, the environment of the modular housing, or external monitoring. The control system 110 may be operatively connected to one or more lighting systems 104. This may allow for automatic control of visible lighting elements and lighting elements operating outside of the visible spectrum such as UV lighting elements. The UV lighting elements may, for example, be used in the manufacturing process. The control system 110 may be operatively connected to one or more manufacturing platforms or manufacturing equipment 30 such as additive manufacturing platforms such as 3D printers. The control system 110 may be operatively connected to one or more power sources 106 which may include grid power sources, solar power sources, multi-fuel power sources, and battery power sources. The control system 110 may be operatively connected to one or more HVAC systems 70 for control of the one or more HVAC systems 70.

In some embodiments, each of the various systems may be operatively connected to one or more networks 102 with each system having its own network interface. In such embodiments, the control system 110 may send and/or receive messages over the network in order to communicate data and control functions. There may be more than one control system present.

The modular housing 12 may also be configured to include a landing or docking area 120 such as to allow a drone or aerial vehicle to land and load or unload a payload. For example, a landing platform equipped with automatic load and unload functionality allows for drone delivery of products printed or otherwise manufactured within the modular housing 12. Thus, not only can a broken part be repaired, or a replacement part manufactured on demand in the field (at the modular housing 12), but the repaired part or the replacement part may then be conveyed to a drone at the modular housing 12 and delivered to the point of need at the time of need.

The communication system 100 of the modular housing 12 may allow for communication with a communication of the drone to allow for information transfer. Where such communications occur, all information transfer and data that is need for drone deployment may be handled in a cyber-secure manner and as appropriate, block chain technology for secure file transactions.

Figure 8:
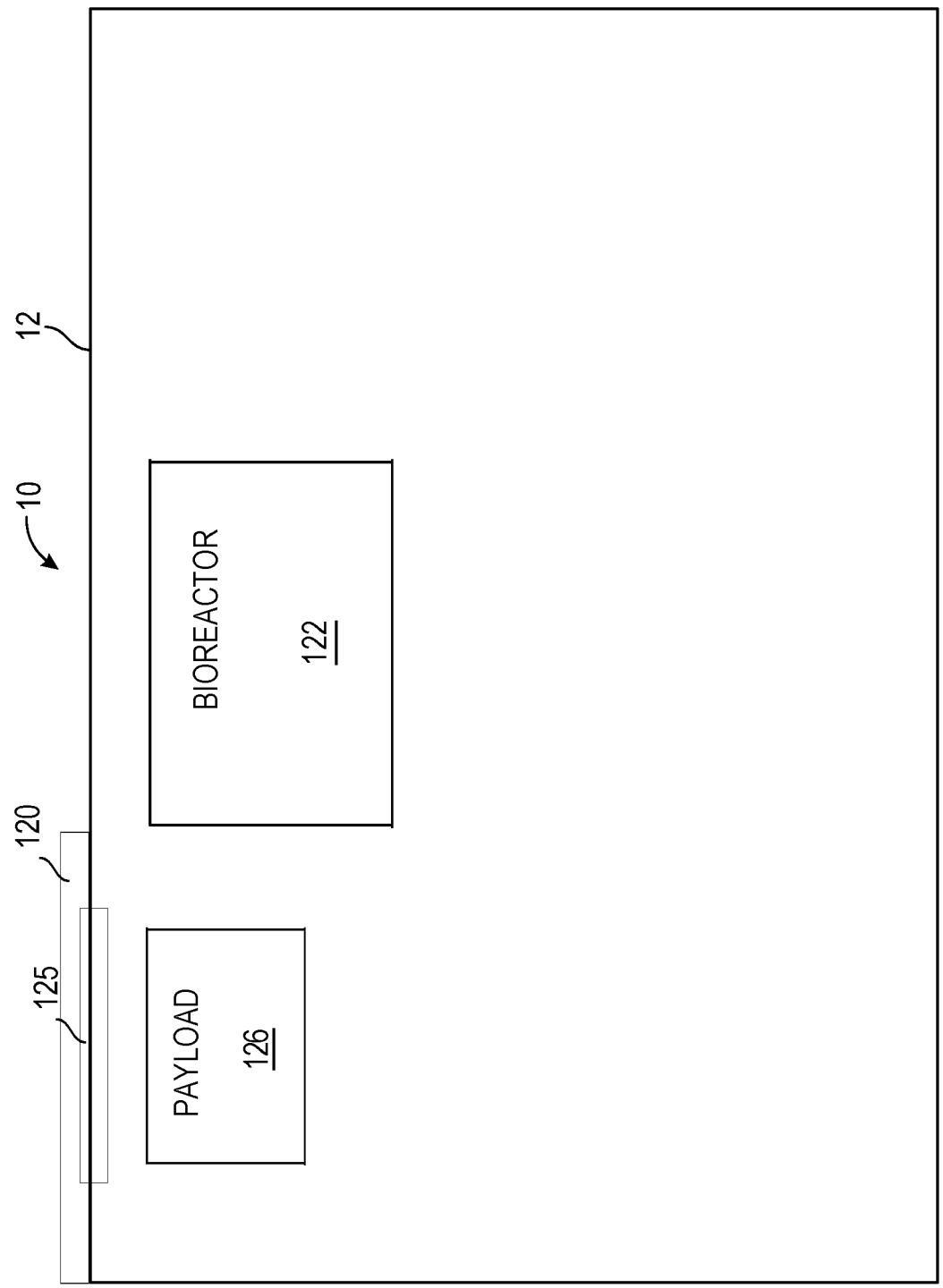
FIG. 8 illustrates an embodiment of a system with a modular housing with a landing or docking area in more detail.

FIG. 8 illustrates an embodiment of a system 10 with a modular housing 12 with a landing or docking area 120 in more detail. In some embodiments, the modular housing 12 may include a landing or docking area 120 such as on a top surface of the modular housing 12. There may be an opening or access point such as provided by a door or hatch 125 at or near the landing area in order to allow for the transfer of a payload to or from a drone. In some embodiments the modular housing 12 may be configured for manufacturing of and delivery of medical supplies. In one embodiment a bioreactor 122 may be housed within the modular housing 12 for manufacturing biological products such as blood. In such embodiments, a payload 126 of blood may be packaged within the modular housing 12 and conveyed to at or proximate the landing area for pickup by a drone. Preferably, the packing provides for thermal management and the transport container provides impact protection. Thus, the blood may be conveyed to the exact point of need at the time of need. In such embodiments, it is to be understood that the HVAC equipment or environment controls may be used to provide an appropriate environment for operation of the bioreactor and the bioreactor may be appropriately powered or controlled by the power sources, controlled by the control system(s) 110.

In operation, a system of one or more modular housings may be rapidly configured and deployed. Configuration of a particular system may be based on the type of item or items which are to be direct digitally manufactured. For example, if the item(s) include circuit boards with electronics then the manufacturing platforms and equipment are selected and configured to allow for such manufacturing and consumables such as feedstock, powders, etc. may be stocked and the particular system may be further configured to store such materials at appropriate temperatures. In addition, the environment controls may customized to accommodate the particular configuration of manufacturing platforms and equipment used. The power source(s) may be selected based on power requirements for the selected manufacturing platforms and equipment. In addition, the modular housing may be configured for providing items to drones for delivery and/or for receiving feedstocks via drones. In a further example, if a biological material such as blood is being manufactured then the modular housing may be rapidly configured and deployed such as to include a bioreactor for manufacturing blood, packaging for the biological material, and a landing platform for receiving drones for delivery of the biological material.

The invention is not to be limited to the particular embodiments described herein. In particular, the invention contemplates numerous variations in the manufacturing platforms and equipment used, the size and configuration of the modular housing, the particular sub-systems included within the modular housing, and other variations, options, and alternatives. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A modular system for manufacturing, the modular system comprising:
   a shipping container;
   at least one manufacturing platform disposed within the shipping container for direct digital manufacturing of an item;
   a modular grid for power and network connections positioned along a plurality of interior walls of the shipping container;
   wherein the at least one manufacturing platform includes at least one 3D printer;
   wherein the at least one manufacturing platform comprises at least one of a furnace and an oven;
   a control system;
   a sensing system operatively connected to the control system;
   wherein the sensing system comprises a plurality of sensors configured to sense temperature in and around the shipping container, position and operation of the at least one 3D printer within the shipping container and position and operation of the at least one of the furnace and the oven within the shipping container.

2. The modular system for manufacturing of claim 1 wherein the control system is configured to monitor the sensing system to determine temperature in and around the shipping container, the position and the operation of the at least one 3D printer within the shipping container and the position and the operation of the at least one of the furnace and the oven within the shipping container.

3. The modular system for manufacturing of claim 1 wherein interior walls of the shipping container have a metallic skin.

4. The modular system for manufacturing of claim 1 wherein the shipping container includes electrostatic discharge flooring.

5. The modular system for manufacturing of claim 1 wherein the shipping container comprises a plurality of lighting elements embedded in at least one of (a) one or more of the interior walls of the shipping container, (b) a flooring of the shipping container, and/or (c) a ceiling of the shipping container.

6. The modular system for manufacturing of claim 5 wherein the plurality of lighting elements include ultraviolet lighting elements.

7. The modular system for manufacturing of claim 1 further comprising an HVAC system wherein at least a portion of the HVAC system is integrated into at least one at least one of (a) one or more of the interior walls of the shipping container, (b) a flooring of the shipping container, and/or (c) a ceiling of the shipping container.

8. The modular system for manufacturing of claim 1 further comprising at least one interface housing having a magnet for connection to a location along one of the interior walls.

9. The modular system for manufacturing of claim 8 wherein the at least one interface housing comprises a power receptacle.

10. The modular system for manufacturing of claim 8 wherein the at least one interface housing comprises a network interface.

11. The modular system for manufacturing of claim 8 further comprising a power system electrically connected to the at least one interface housing.

12. The modular system for manufacturing of claim 8 wherein the power system is selected from a set consisting of a grid power system, a solar power system, and a multi-fuel power system.

13. The modular system for manufacturing of claim 1 further comprising a communications system.

14. The modular system for manufacturing of claim 13 wherein the communications system provides for at least one of WiFi communications, LiFi communications, and satellite communications.

15. The modular system for manufacturing of claim 14 wherein the communications system provides for secure file transactions.

16. The modular system for manufacturing of claim 15 wherein the communications system provides for block chain based secure file transactions.

17. The modular system for manufacturing of claim 1 wherein the shipping container is collapsible.

18. The modular system for manufacturing of claim 1 wherein a first wall of the shipping container is hinged to second wall of the shipping container.

19. The modular system for manufacturing of claim 1 wherein the at least one 3D printer is configured for manufacturing from materials at a temperature of less than 500 degrees Celsius and wherein the at least one manufacturing platform comprises the oven.

20. The modular system for manufacturing of claim 19 wherein the materials include thermoplastics.

21. The modular system for manufacturing of claim 19 wherein the at least one manufacturing platform further comprises a pick and place system.

22. The modular system for manufacturing of claim 1 wherein the at least one 3D printer is configured for manufacturing from materials at a temperature of greater than 500 degrees Celsius and wherein the at least one manufacturing platform comprises the furnace.

23. The modular system for manufacturing of claim 22 wherein the materials include at least one of metal filaments and ceramics.

24. The modular system for manufacturing of claim 22 wherein the at least one manufacturing platform further comprises a pick and place system.

25. The modular system of claim 1 further comprising radio-frequency (RF) shielding integrated into the shipping container.

26. The modular system of claim 1 further comprising a landing platform positioned on the shipping container.

27. The modular system of claim 1 further comprising a bioreactor positioned within the shipping container.

* * * * *